Patented Mar. 20, 1951

2,545,828

UNITED STATES PATENT OFFICE 2,545,828

PROCESS OF RECLAIMING SCRAP OF SYNTHETIC AND NATURAL RUBBERS

Robert L. Randall, St. Louis, Mo., assignor, by mesne assignments, to Midwest Rubber Reclaiming Company, East St. Louis, Ill., a corporation of Delaware No Drawing. Application November 28, 1945, Serial No. 631,481

7 Claims. (Cl. 260—2.3)

The present invention relates to a process of reclaiming waste rubber scrap and while it has been found that the discovery herein disclosed is a distinct improvement in the reclaiming of natural rubber scrap, the invention was prompted by the difficulties experienced by the rubber reclaimer in reclaiming scrap composed of certain so-called synthetic rubbers which may be described as olefine and diolefine polymers and copolymers. The synthetic rubbers for the reclamation of which the process herein described is particularly adapted and in which field it has its present greatest utility are what are known in the trade as Buna-S rubber or GRS and Butyl rubber. The former is a copolymer of butadiene and styrene and is used extensively as a substitute for natural rubber. Where the term "Buna-S" is employed in the specification and claims, it will be understood that it is intended to be sufficiently broad to cover any proportions of the monomers which may be employed in the making of this type of synthetic rubber. Butyl rubber is a copolymer of isobutylene and small amounts of other unsaturated hydrocarbons such as butadiene or isoprene, and it has special fields of commercial utility.

Synthetic rubbers have proved to be very difficult to soften and reclaim by known methods for reclaiming natural rubbers. Many well known reagents which are especially valuable for and have been widely used in the reclaiming of natural rubber are either very inefficient or ineffective when used for Buna-S or Butyl scrap. Since Pearl Harbor much scrap material comes to the reclaimer which is composed wholly of either Buna-S or Butyl synthetic rubber and it has been necessary to find some efficient and economical process by which scrap of this nature can be rendered capable of reuse. The discovery of a process for satisfactorily reclaiming these synthetic rubbers is a valuable advance in this art.

The process which is disclosed herein has been found, after extensive tests in the laboratory and also in actual commercial operations carried on at a large scale, to provide a method by which it is possible to treat scrap material containing Buna-S or Butyl rubbers and obtain a satisfactory reclaim with a minimum loss due to tailings or rejects. The process has a great advantage in that it may be carried on with the usual factory technique and equipment, and except for the substitution of the reagent specified herein for ordinary reagents, the new process requires no appreciable change in factory routine.

While, as stated above, the discovery covered herein was brought about by the increase in the use of these two particular types or kinds of synthetic rubber which gave rise to increasing accumulation of scrap containing such materials, the invention is not to be construed as confined to the reclamation of these synthetic rubbers alone. After it had developed that the process had particular and especial value in the reclaiming of these artificial rubbers, it was applied to the reclamation of natural rubber scrap and was found to produce outstanding results. It is also possible that further developments may be made in the art or manufacture of synthetic rubbers or rubber-like materials and that the process may be utilized to advantage in the reclaiming of such materials.

The invention, therefore, is not restricted to the reclaiming of the two types of synthetic rubbers particularly named herein, but it covers the reclaiming of natural rubber or other types of synthetic rubbers or rubber-like materials to which the process may be found to be applicable.

In evaluating the reclaim, various tests are more or less considered as standard, but a generally accepted standard is what is known as the Mooney plasticity test (see Industrial and Engineering Chemistry, vol. 6, p. 147, 1934). This method of testing plasticity is well known to those skilled in the art and is a fair method of determining this important characteristic of the finished product. Reclaims of both Buna-S and Butyl scrap have shown Mooney values ranging between 20 and 100 and any finished product coming within that range is a satisfactory reclaim and may be employed with excellent results in subsequent manufacturing operations.

A further advantage of the process is in the fact that much lower percentages of tailings are obtained. Tailings are the small particles of unreclaimed stock which detach themselves from the sheet of reclaim as it is made on the refiner. It is desirable to maintain a tailing production in the reclaim of these materials of not over 8%. As indicated herein, the tailings resulting from the use of this process will not exceed 8% and in some cases tailings have been much lower or completely eliminated.

In carrying out the process, usual procedures common in many reclaiming plants are employed. The process can be carried out either in a jacketed "digester" in the presence of a relatively large body of water, or in a "heater" in the presence of steam. Typical examples of the process will be given.

The scrap material containing the Buna-S or Butyl synthetic rubber which is to be reclaimed by the process described herein may or may not contain fabric. But if it should, the scrap material may be defibered by mechanical means or by any well known chemical process either prior to or simultaneously with the reclamation of the scrap.

In the use of standard processes, the scrap material is cut up and ground until all of the particles thereof will pass through a ¼" mesh and is then fed to a jacketed digester with a relatively large body of water and the reagent which acts to soften or "reclaim" the rubber with heat and under pressure. The digesting process is carried on for a number of hours until the reclaiming agent has fully acted upon the rubber. The digester is then emptied and the liquid contents of the mass are removed by mechanical means well known and the reclaimed scrap is then washed to remove any traces of free reagent. The scrap is then dried, milled and refined, the latter process consisting in sheeting out the reclaim into very thin sheets which are wound up on a roll from which the stock is cut. It is during this refining process that any bits of unreclaimed rubber which constitute the tailings fall from the sheet.

During these latter operations, any fillers, softeners, mineral rubber or reagents may be added as called for by the customer's specifications. The resultant product is a uniform mass of reclaimed rubber of the proper plasticity and free of particles of unreclaimed rubber, or "pimples" as they are known in the trade.

In order to secure the results set forth, a wholly new reclaiming agent is used to soften or reclaim the rubber. This reagent is the residue obtained as a by-product of gasoline refining by the clay tower adsorption process or what is known as the "Gray Tower" process of gasoline refining which is described in Burk, Thompson, Weith and Williams, Polymerization, pp. 232–233. It is ordinarily a thick, dark brown, viscous liquid sold by a number of petroleum refining companies and has a limited commercial value. It is, however, available at times as a solid, in which case it is necessary to employ a small proportion of a solvent, such as naphtha, to make it usable in the process.

The reagent is a mixture of unsaturated hydrocarbons with short aliphatic side-chains. These hydrocarbons consist of some aromatic, some naphthenic (cycloparaffinic) and some cyclo-olefinic compounds. The unsaturation of these compounds is found partly in the ring structures and partly in the aliphatic side-chains. The aliphatic side-chains consist of carbon and hydrogen only and usually do not contain more than three or four carbon atoms. In short, this reagent can be defined as a mixture of compounds containing bi- and tri-cyclic fused ring structures with short aliphatic side-chains. The material has a very high iodine number, being in the range of between 150 and 375 which is indicative of a high degree of unsaturation. As the iodine number increases, the viscosity of the material increases until in the higher iodine numbers the material is a solid or practically so. The material is not always uniform and may have considerable variation in physical properties, but these variations do not seem to affect its value as a reclaiming agent. Analyses of typical oils or reclaiming resins, as they may likewise be designated, are as follows:

| Sample No. | 1 | 2 | 3 | 4 | 5 |
|---|---|---|---|---|---|
| Specific Gravity | .958 | .987 | .964 | 1.045 | .960 |
| Iodine Value | 201 | 220 | 170 | 315 | 133 |
| Per Cent Solids | 67.5 | 85.8 | 70.2 | 100 | 68.9 |
| Per Cent Condensed at 450° F. | 20 | 10 | 8 | 1 | 15 |
| Pour Point °F | −20 | 65 | −30 | 177 | −20 |
| S. U. V. at 210° F. | 48 | 127 | 45.8 | Over 200 | 46.2 |

Of the above samples it is preferred to employ resins having properties like or nearly like Sample No. 1 above because such a resin is more readily available, is cheaper and produces satisfactory reclaims of Buna-S, Butyl and natural rubbers.

The reclaiming resin or oil is used in comparatively small amounts, usually from about 2% to about 15% by weight of the rubber scrap to be treated. The exact amount required will depend upon the character of the scrap, the character of the reagent, the time and temperature used in the process, and many other factors. Proportions as low as 1% and as high as 30% may be used for certain purposes.

Examples of the process as carried out in a "heater" for the three types of rubber specified and employing the Number 1 type oil or reclaiming resin are set forth below:

| Example No. | 1 | 2 | 3 |
|---|---|---|---|
| GRS scrap | 100 | | |
| Butyl rubber scrap | | 100 | |
| Natural rubber scrap | | | 100 |
| Reclaiming Resin (#1 above) | 10 | 5 | 2 |
| Temperature of cook °F | 388 | 384 | 370 |
| Time of cook hours | 3 | 3 | 2 |
| Mooney Plasticity | 83 | 66 | 26 |
| Tailings | None | None | None |
| Tensile of Vulcanizate | 700 | 1,700 | 1,350 |
| Per Cent Elongation | 410 | 600 | 590 |
| Shore Hardness | 55 | 56 | 51 |

Further examples of the process are given immediately below. A comparison of the temperatures and time of cook with the previous tables illustrate the general principle that as the temperature is increased, the time required is shortened, and vice versa. The temperature of cook should be above the boiling point of water and preferably not substantially below 287° F. It will also be noted that in the following cases a substantial amount of water is added to the contents of the "digester."

| Example No. | 1 | 2 | 3 | 4 |
|---|---|---|---|---|
| GRS scrap | 100 | 100 | | |
| Butyl rubber scrap | | | 100 | |
| Natural rubber scrap | | | | 100 |
| Reclaiming Resin (#1 above) | 15 | 15 | 5 | 2 |
| Water | 167 | 167 | 167 | 167 |
| Temperature of Cook | 482 | 446 | 482 | 482 |
| Time of Cook minutes | 30 | 60 | 30 | 30 |
| Mooney Plasticity | 37 | 37 | 35 | 20 |
| Tailings | None | None | None | None |
| Tensile of Vulcanizate | 790 | 670 | 1,575 | 1,280 |
| Per Cent Elongation | 400 | 390 | 710 | 550 |
| Shore Hardness | 48 | 54 | 53 | 53 |

In order to show how the various grades or samples of the reagent may be employed in the reclamation of GRS scrap at the same temperature and for the same period, the following table demonstrates the effect of variations in iodine value. GRS stock was selected for this table as it has hitherto proved to be the most difficult scrap to reclaim successfully.

| Examples | 1 | 2 | 3 | 4 | 5 |
|---|---|---|---|---|---|
| GRS scrap | 100 | 100 | 100 | 100 | 100 |
| 133 I value oil | 15 | | | | |
| 170 I value oil | | 15 | | | |
| 201 I value oil | | | 15 | | |
| 220 I value oil | | | | 15 | |
| 315 I value oil | | | | | 10 |
| Solvent Naphtha | | | | | 5 |
| Temperature of Heat °F | 384 | 384 | 384 | 384 | 384 |
| Time of Heat hours | 5 | 5 | 5 | 5 | 5 |
| Mooney Plasticity | 60 | 57 | 57 | 58 | 93 |
| Tailings per cent | 2 | Nil | Nil | Nil | 8 |
| Tensile of Vulcanizate | 580 | 600 | 610 | 650 | 1,050 |
| Per Cent Elongation | 270 | 290 | 370 | 380 | 430 |
| Shore Hardness | 50 | 49 | 49 | 49 | 55 |

It will be understood that it is practically impossible to determine the exact ratio of the reagent which should be employed to secure optimum results with every type of natural or synthetic rubber as this may be varied with condition of the scrap, the exact composition or iodine value of the reagent, or many other factors which may upset a fixed formula. The time and temperature of the reaction will also affect the results.

It will be understood that during the process the scrap is in contact with water or live steam and that there is no upper limitation on the temperatures which may be employed within practical limits.

The process described herein has very substantial value and merit in the rubber reclaiming industry and enables the reclaimer to cope successfully with the problems arising by the present day conditions in which often large quantities of straight Buna-S and Butyl rubbers are found on the market. By "straight" is meant supplies of scrap synthetic rubber not mixed with a natural rubber. In the reclamation of mixed scraps in which the same basic reagent is used, i. e., the residue obtained from gasoline refining by the "Gray Tower" process, an additional reagent can also be advantageously used and this process is covered in my copending application Serial Number 605,183, filed July 14, 1945, now Patent Number 2,471,496.

In conclusion, it may be stated that the specific details of the process disclosed herein are not intended to be construed as limiting the invention beyond the apparent scope of the claims. The process may be modified or improved upon without departing from the principles of the invention. It has been sought herein to give a full and adequate disclosure of the best known and preferred forms of the invention and methods of practising the same, and this disclosure is not to be considered in any other aspect.

What is claimed is:

1. The process of reclaiming previously vulcanized rubber scrap composed of a substance selected from the group consisting of natural rubber, a rubbery copolymer of butadiene and styrene and a rubbery copolymer containing a major amount of isobutylene and a minor amount of a diolefine, which consists in adding to one of said scraps not in excess of 30% by weight of a reclaiming agent which is Gray Tower resin oil obtained as a residual by-product in the refining of gasoline and treating the mixture with steam until the scrap is softened and rendered sufficiently plastic to be reused in the manufacture of vulcanized articles.

2. The process of reclaiming previously vulcanized rubber scrap composed of a substance selected from the group consisting of natural rubber, a rubbery copolymer of butadiene and styrene and a rubbery copolymer containing a major amount of isobutylene and a minor amount of a diolefine, which consists in adding to one of said scraps from about 2% to in the neighborhood of 15% by weight of a Gray Tower resin oil reclaiming agent which is a residual by-product obtained in the refining of gasoline and treating the mixture with steam until the scrap is softened and rendered sufficiently plastic to be reused in the manufacture of vulcanized articles.

3. The process of reclaiming previously vulcanized rubber scrap composed of a substance selected from the group consisting of natural rubber, a rubbery copolymer of butadiene and styrene and a rubbery copolymer containing a major amount of isobutylene and a minor amount of a diolefine, comprising mixing one of said scraps with from about 2% to about 15% by weight of Gray Tower resin oil which is a residual by-product obtained in the refining of gasoline, and heating the mixture with steam until the scrap is softened and rendered sufficiently plastic to be reused in the manufacture of vulcanized articles.

4. The process of reclaiming previously vulcanized rubber scrap composed of a substance selected from the group consisting of natural rubber, a rubbery copolymer of butadiene and styrene and a rubbery copolymer containing a major amount of isobutylene and a minor amount of a diolefine, which comprises adding to said scrap and water not in excess of 30% by weight of Gray Tower resin oil which is a residual by-product of refining gasoline, and heating the mixture at temperatures above the boiling point of water until the scrap is softened and rendered sufficiently plastic to be reused in the manufacture of vulcanized articles.

5. The process of reclaiming previously vulcanized rubber scrap composed of a substance selected from the group consisting of natural rubber, a rubbery copolymer of butadiene and styrene and a rubbery copolymer containing a major amount of isobutylene and a minor amount of a diolefine, which comprises adding to water and said scrap not in excess of 30% by weight of Gray Tower resin oil obtained as a residual by-product in the refining of gasoline and heating the same to a temperature above the boiling point of water for the time required to render the scrap sufficiently plastic to be reworkable in the manufacture of vulcanized rubber products.

6. The process of reclaiming previously vulcanized rubber scrap composed of a substance selected from the group consisting of natural rubber, a rubbery copolymer of butadiene and styrene and a rubbery copolymer containing a major amount of isobutylene and a minor amount of a diolefine, which comprises adding to said scrap not in excess of 30% by weight of Gray Tower resin oil which is obtained as a residual by-product in the refining of gasoline, and subjecting the mixture to steam at a sufficiently high temperature and for the time required to give the scrap a Mooney plasticity between 20 and 100.

7. The process of reclaiming previously vulcanized rubber scrap composed of a substance selected from the group consisting of natural rubber, a rubbery copolymer of butadiene and styrene and a rubbery copolymer containing a major amount of isobutylene and a minor amount of a diolefine, which comprises adding to said scrap from between about 2% to about 15% by weight of Gray Tower resin oil which is obtained as a residue in the refining of gasoline, and subjecting the mixture to steam at a sufficiently high temperature and for the time required to give the scrap a Mooney plasticity between 20 and 100.

ROBERT L. RANDALL.

REFERENCES CITED

The following references are of record in the file of this patent:

UNITED STATES PATENTS

| Number | Name | Date |
| --- | --- | --- |
| 2,008,102 | Hyman | July 16, 1935 |
| 2,324,980 | Kilbourne et al. | July 20, 1943 |